United States Patent [19]

Mader et al.

[11] Patent Number: 4,848,794
[45] Date of Patent: Jul. 18, 1989

[54] FREE RUNNING CINCHING CONNECTOR

[75] Inventors: Robert Mader, Clawson; Gary P. Staniszewski, Utica, both of Mich.

[73] Assignee: Allied-Signal Inc., Morris Township, Morris County, N.J.

[21] Appl. No.: 198,237

[22] Filed: May 25, 1988

[51] Int. Cl.⁴ .......................................... B60R 21/10
[52] U.S. Cl. .................................. 280/801; 24/68 SB; 24/171; 297/483; 280/808
[58] Field of Search ............ 280/801, 808; 24/68 SB, 24/171; 297/483

[56] References Cited

U.S. PATENT DOCUMENTS

| | | | |
|---|---|---|---|
| 1,873,371 | 8/1932 | Ford | 24/196 |
| 2,878,540 | 3/1959 | White | 24/196 |
| 2,896,284 | 7/1959 | Bishaf | 24/638 |
| 3,226,786 | 1/1986 | Burdorf | 24/171 |
| 3,233,300 | 2/1966 | Meeker | 24/637 |
| 3,378,301 | 4/1968 | Romanzi | 297/483 |
| 3,993,328 | 11/1976 | Henderson | 280/807 |
| 4,491,343 | 1/1985 | Fohl | 280/801 |
| 4,608,735 | 9/1986 | Kasai | 24/171 |

FOREIGN PATENT DOCUMENTS 2506297 8/1975 Fed. Rep. of Germany ...... 280/801
160418 5/1933 Switzerland .

*Primary Examiner*—Kenneth R. Rice
*Attorney, Agent, or Firm*—Markell Seitzman

[57] ABSTRACT

A safety belt connector fitting is disclosed in association with a three-point safety belt harness wherein the connector fitting is mounted on a mid-portion of the belt to be releasably anchored to an associated push button type buckle positioned inboard of the vehicle passenger seat. The slide bar of the connector fitting has a web spanning the belt receiving aperture of the fitting base plate for entraining the safety belt through the fitting. The web has upper longitudinal corner surfaces which are truncated to provide flattened surfaces facilitating sliding movement of the belt thereby when the fitting is suspended on the belt in a stored condition. Lower longitudinally extending corners of the web have conventional right angle corner configurations to cinch the safety belt between the slide bar and the fitting base when the connector is in use to hold a passenger via lower portions of the safety belt in his vehicle seat in an emergency condition.

5 Claims, 3 Drawing Sheets

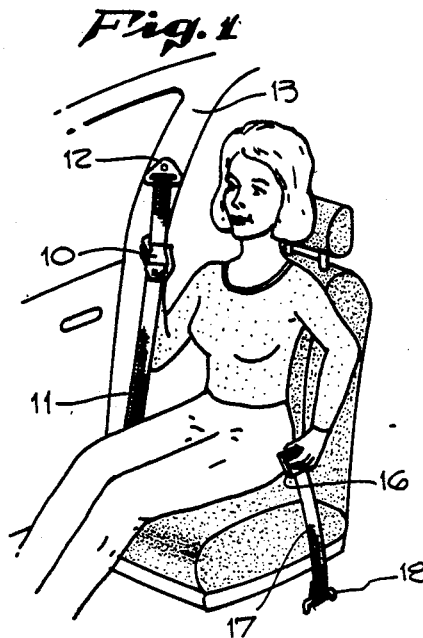
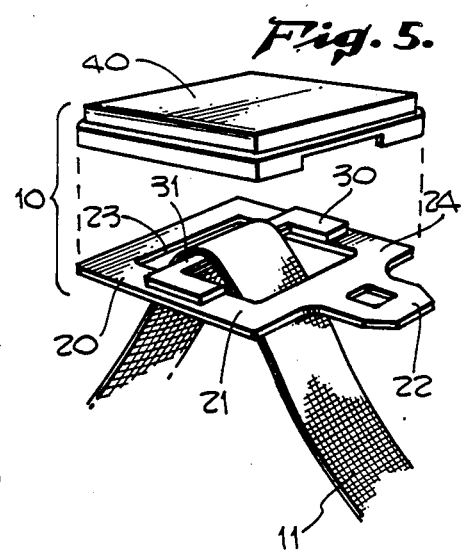
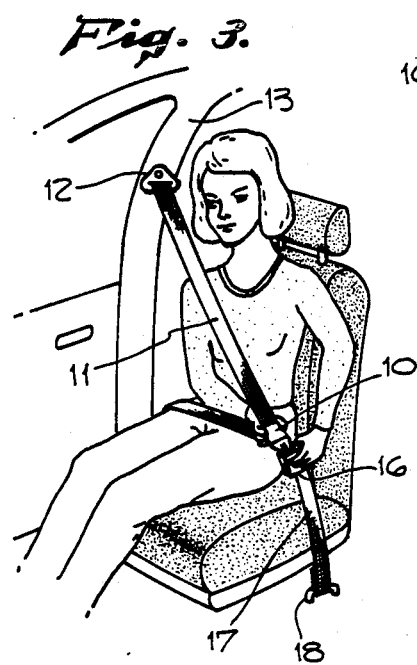
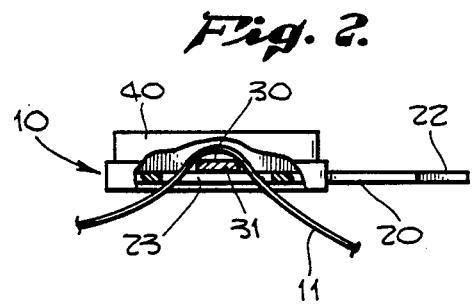
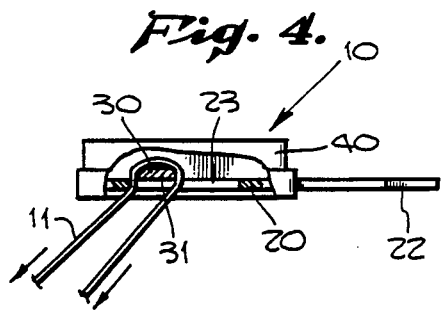

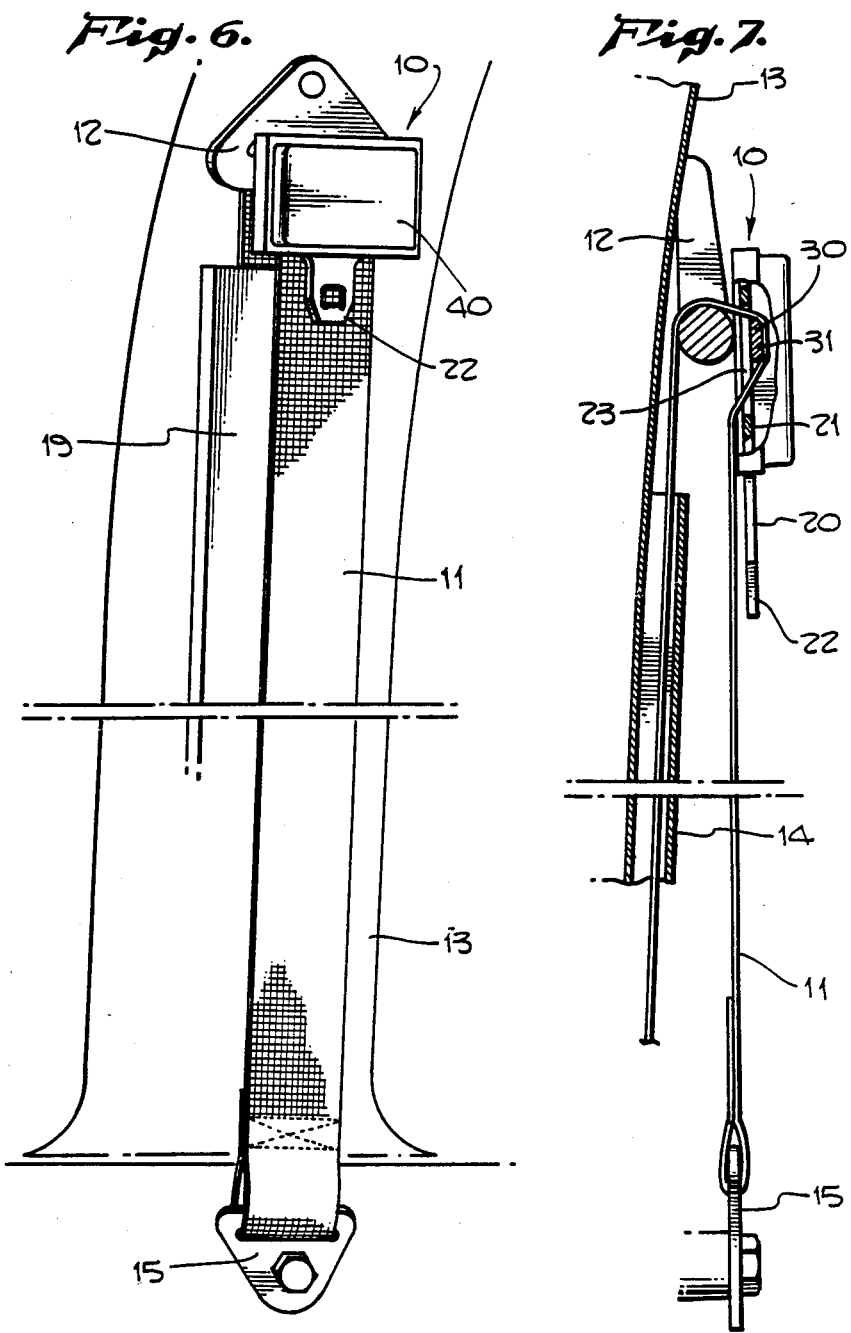

FREE RUNNING CINCHING CONNECTOR

BACKGROUND OF THE INVENTION

The present invention relates to three-point safety belt harnesses employed for restraining a vehicle passenger in a seat during an emergency condition and particularly to the connector fitting suspended on the continuous safety belt having two of the anchor points and which is anchored to a third anchor, normally inboard of the vehicle seat by a releasable connection between the connector fitting and a buckle connected to such inboard anchor by a safety belt strap or the like.

The so called "three-point" safety belt harnesses presently employed in the automobile industry generally include a first safety belt which is anchored at a first lower end to the vehicle B-pillar near the floor adjacent the outboard side of the passenger seat and the other end being wound upon a conventional emergency locking safety belt retractor provided on the B-pillar at approximately shoulder height relative to the passenger seated on the vehicle seat. The connector fitting normally entrained on the safety belt is provided so that when the connector fitting is coupled with a mating connector, such as a conventional push button buckle, the connector cinches the lap portion of the belt to hold the passenger in his seat. In such prior art construction of connector fittings, it is possible that the fitting will impede the retraction of the safety belt onto the retractor when the connector fitting engages the webbing guide after being released from the associated buckle by the passenger. This possible condition of having slack portions of the safety belt hanging loosely adjacent the B-pillar is more likely to occur with the modern approach of reducing the spring tension of the retractor associated with the belt in order to reduce the normal spring tension applied across the chest of the vehicle passenger by the safety belt when in use. It is desirable to have the so called "softly-sprung" belt system to reduce the pressure on the vehicle passenger's chest and to allow the passenger a more free upper body movement than might be afforded by a stronger spring in the retraction mechanism which could draw the safety belt through the connector fitting and associated web guide into the retractor when the belt is not in use.

It is thus become desirable to have a free-running cinching connector which will allow upper body movement of the chest portion of a three-point safety belt harness employing a so called "softly-sprung" belt system as is presently known in the art while keeping the lower body portion of the passenger securely in place on the seat through the cinching action of the connector fitting when in use more particularly, it would be desirable in such an arrangement to have the connector provided so that when the belt is not in use the connector will be suspended on the safety belt in such a manner as to ride up to the belt guide, generally adjacent the shoulder of the vehicle passenger when seated in the vehicle seat, but allow the webbing to pass substantially freely through to be wound up on a safety belt retractor which may be of a relatively low spring tension or softly-sprung nature as is known in the art.

SUMMARY OF THE INVENTION:

It is the primary object of the present invention to provide a free-running cinching connector which is provided so as to have a non-cinching belt engaging characteristic when suspended on the safety belt when the latter is in a stored, non-use condition adjacent the B-pillar of the vehicle in which the harness is employed, which has sufficient friction characteristics between the connector and belt so as to cause the belt to carry the connector up to the associated belt guide and so as to provide a cinching of the safety belt when the connector is releasably connected to a mating floor anchored fitting such as a safety belt buckle to provide a three-point type harness restraint for the vehicle passenger and particularly a cinching of the occupant's lower body portions by the lap portion of the belt downwardly onto the seat of the vehicle.

Generally stated, the present invention in a free-running cinching connector for use in a safety belt of a vehicle passenger restraint safety harness includes the provision of an otherwise conventional connector fitting having a safety belt entraining aperture and a slide member of special configuration provided thereon for entraining the safety belt to the fitting, such slide member having non-cinching belt engaging upper surfaces and cinching belt engaging lower surfaces whereby the connector fitting can run freely along the belt when the belt engages only the upper surfaces of the slide member and is cinched in a fixed relation relatively to the safety belt when the belt is trapped between a slide member lower surface and adjacent portions of the fitting belt receiving aperture when the belt is placed in use for restraining a passenger in his seat.

More specifically, the present invention in connector fitting construction for a three-point type safety belt harness includes the provision of a web portion of the slide member with a longitudinal extent spanning the belt receiving aperture of the connector fitting base plate wherein upper, lower, front and rear surfaces of such web merge into four longitudinally extending web corners, two of such corners being lower corners generally facing the connector fitting base plate and being of substantially right angle configuration and the other two of such corners being upper corners facing away from such plate and being of a blunted configuration to facilitate the belt sliding thereover. In a specific embodiment of the present invention, the blunted upper corners of the web portion of the slide member are provided by flat surfaces formed by truncating each of the upper corners so as to provide a pair of longitudinally extending planar surfaces inclined downwardly along marginal areas of the web upper surface. Such surfaces facilitate the sliding of the safety belt over the slide member to provide a free-running characteristic of the connector when the belt is not in use, yet still maintaining sufficient frictional force between the connector parts engaging the safety belt so as to cause the connector to be stowed in a desirable shoulder height position adjacent the web guide normally mounted to the B-pillar of the vehicle.

The foregoing objects, and various advantages of the present invention, as well as a better understanding of the present invention generally described thus far, will become apparent to those skilled in the art from a consideration of the following detailed description of a preferred exemplary embodiment of the free-running cinching connector in accordance with the present invention.

Reference will be made to the appended sheets of drawings, which will now be briefly described.

BRIEF DESCRIPTION OF THE DRAWINGS

FIG. 1 is a depiction of a vehicle passenger seated in a vehicle front seat with a typical three-point safety belt harness installation for restraining the passenger in the seat, the harness including an exemplary embodiment of free running cinching connector for connecting the safety belt to the exemplary floor anchor connector in accordance with the present invention;

FIG. 2 is a vertical section view through the exemplary embodiment of free running cinching connector of FIG. 1;

FIG. 3 is a view as in FIG. 1 showing the free running cinching connector on a safety belt being assembled to the floor anchor adjacent the vehicle seat;

FIG. 4 is a vertical section view through the connector of FIG. 3 showing its orientation in position to cinch the associated webbing when connected to the floor anchor;

FIG. 5 is an exploded view of the free running cinching connector of FIGS. 1 through 4;

FIG. 6 is a vertical view of the exemplary three-point safety belt harness of FIGS. 1 and 3 shown in webbing stowed condition, the webbing being fully wound upon the associated safety belt retractor and the exemplary connector having been carried to the associated belt guide;

FIG. 7 is a side view, partially in section, of the harness and connector of FIG. 6;

DETAILED DESCRIPTION OF THE PREFERRED EXEMPLARY EMBODIMENT

Figure 8:
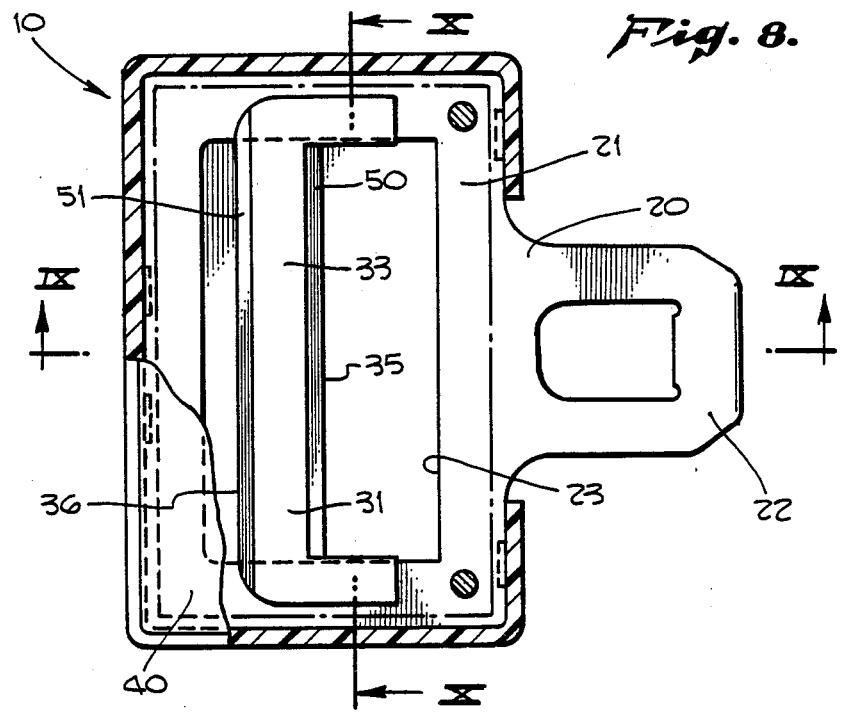
FIG. 8 is a plan view, partially in section, of the preferred exemplary embodiment of free running cinching connector in accordance with the present invention showing the exemplary slide member resting on top of the exemplary connector fitting.

Referring initially to FIG. 1, a preferred exemplary embodiment of free running cinching connector 10, in accordance with the present invention, is illustrated in association with an otherwise typical three-point safety belt harness. The exemplary safety belt harness includes belt 11 anchored by a floor anchor adjacent the outboard side of the vehicle seat and entrained by a conventional belt guide 12 attached to the B-pillar 13 of the vehicle. As seen in FIG. 7, the belt 11 passes through the web guide 12 and into the B-pillar housing 14 to a conventional automatic locking safety belt retractor (not illustrated) anchored to the vehicle frame. The other end of belt 11, as seen in FIGS. 6 and 7, is anchored by end fitting 15 to the vehicle frame adjacent the vehicle floor in conventional manner.

The inboard portion of the safety harness in the exemplary embodiment includes a safety belt buckle 16, which may comprise a conventional push button type buckle, which serves as a mating connector for the free running cinching connector 10 as seen in FIG. 3. Buckle 16 is mounted in known manner to belt strap 17 which in turn is anchored in known manner to floor anchor 18 adjacent the inboard side of the vehicle seat as seen in FIGS. 1 and 3.

Referring now to the exploded view of FIG. 5, the preferred exemplary embodiment of free running cinching connector 10, in accordance with the present invention, includes a connector fitting 20 comprising a base plate 21 having a buckle connecting aperture tongue 22 and a belt receiving aperture 23. A slide member 30 is also provided which rests upon the upper surface 24 of the base plate 21 and is held in assembled relation thereto by the presence of the safety belt 11 which enters through a rear portion of aperture 23, passes over a web 31 thereof and then down and outwardly through a forward portion of the aperture 23 where it terminates in a free end which is pulled in known manner by the user to cinch up the connector 10 after being engaged in releasable manner with the buckle 16 in the general orientation illustrated in FIG. 3. A lightweight plastic cover 40 is provided to enclose the upper portions of the base plate 21 and protect the slide bar 30 and safety belt adjacent thereof from being dislodged from the connector when the belt 11 is loosely entrained therethrough.

As is particularly contemplated within the present invention, the slide member 30 is provided so as to have non-cinching belt engaging upper surfaces and belt cinching engaging lower surfaces whereby when the connector 10 is suspended on belt 11 when the belt is in an non-used or stored condition as seen in FIG. 6, the friction between the connector and belt will cause the connector to ride up to the web guide 12 while still allowing the belt to ride therethrough under the rewind pressure of the retractor rewind spring so that the belt is fully stowed as seen in FIGS. 6 and 7. More specifically, the web 31 of the slide bar 30, in accordance with the present invention, is provided with a longitudinally extent spanning the aperture 23, as seen in FIGS. 8, 9 and 10, and having upper and lower surfaces 33 and 34, respectively and front and rear surfaces 35 and 36, respectively which merge into four longitudinally extending web corners.

Figure 9:
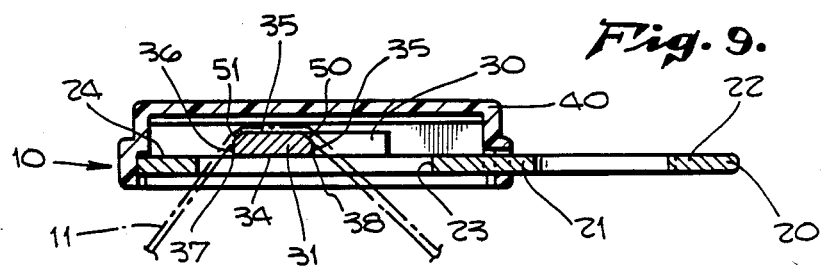
FIG. 9 is a section view of the connector of FIG. 8 taken therein along the plane IX—IX.
Figure 10:
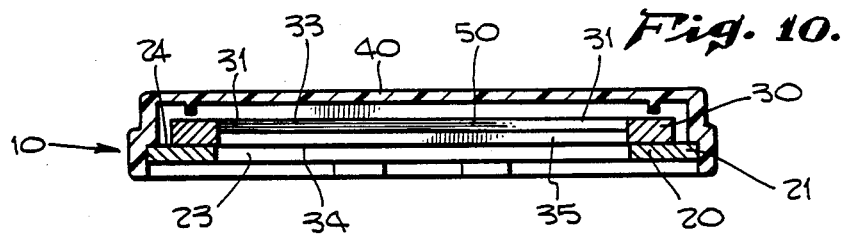
FIG. 10 is a section view of the connector of FIG. 8 taken therein along the plane X—X.

Two of such web corners comprise lower corners 37 and 38, as seen in FIG. 9, which are of substantially right angle configuration to provide belt cinching edges of the web. The lower corners 37 and 38, respectively, face the upper surface 24 of base plate 21, the rear corner 37 providing the belt cinching web engagement means as seen in FIG. 4 where the belt 11 is cinched between the slide bar 30 and base plate 20 of connector 10 when it is placed in a position of use.

As best seen in FIG. 8, the upper two corners of the web 31 are blunted, in the exemplary embodiment, by the flat surfaces 50 and 51. The upper corners of web 31 are in effect, truncated, that is cut off, by the flat surfaces 50 and 51 to provide non-cinching belt engaging surfaces extending longitudinally of web 31 at least for the width of the aperture 23 through which the belt 11 is entrained.

When the safety belt 11 is in a non-used or stowed condition as seen in FIGS. 6 and 7, the connector 10 is suspended upon the webbing 11 as seen in FIG. 7 with the belt riding over the web 30 in a non-cinching relationship by virtue of the flat surfaces 50 and 51. As can be seen in FIG. 7, the safety belt 11 may be drawn through the connector 10 under the urging of a standard retractor rewind spring tension by virtue of the friction reducing affect of the blunted or upper edges of the web of plate 30. However, it has been found that the friction forces generated between the webbing 11, plate 21 and bar 30 are sufficient to cause the connector 10, of the present invention, to ride with the belt 11 up to the web guide 12 so as to be in a convenient stowed condition ready for the vehicle occupant to reach at approximate shoulder height, as seen in FIG. 1, so that the connector can be pulled conveniently across the user's lap and chest to be buckled into the associated releasable buckle 16. However, when the connector 10 is placed in a position of use, as seen in FIGS. 3 and 4, the belt 11 is cinched in otherwise known manner between the base plate 20 and the slide bar 30 by virtue of the right angle corner to corner abutment of the rear lower corner 37 of the slide bar and the adjacent corner of the aperture 23.

It has been found that the connector of the present invention is particularly suitable for use with safety belt harnesses wherein a lower tension or softly-sprung belt system is employed to reduce the tension of the belt on the user's chest. In such harnesses, the connector 10 of the present invention allows for the free upper body movement desired with a lower tension or softly-sprung belt system while keeping the lower body securely in place on the seat by virtue of the cinching capabilities of the connector, the connector still having the free-running characteristics desired for the connector when it is released from the associated buckle or anchor means and is retracted to a stowed condition adjacent the vehicle B-pillar as illustrated herein.

Having thus described a preferred exemplary embodiment of a free running cinching connector for use with a three-point safety belt harness, in accordance with the present invention, it should be apparent to those skilled in the art that the aforestated objects and advantages have been obtained and that various modifications, adaptations and alterations thereof may be made within the scope of the present invention which is defined by the following claims.

I claim:

1. In a three-point safety belt harness for retaining a vehicle passenger in his seat, said harness including a safety belt having one end wound upon a spring bias storage retractor and an opposite end connected to an anchor adjacent the passenger seat, a belt guide generally adjacent the shoulder of said passenger with said belt being entrained therethrough, a releasable connector anchored on an opposite side of said passenger and a connector mating fitting slidably mounted upon said belt for releasable connection to said connector, the improvement of said fitting comprising the provision of:
    a connector fitting base plate having a belt receiving aperture;
    a slide bar slidably positioned on said base plate with a web of said bar spanning said aperture and having said belt entering a portion of said aperture on one side of said web, passing over said web and exiting said aperture on a second side of said web;
    said web having a longitudinal extent spanning said aperture with upper and lower, front and rear, surfaces merging in four longitudinally extending web corners, two of said corners being lower corners generally facing said base plate and being of substantially right angle configuration to the base plate and the other two of said corners being upper corners facing away from said base plate and being of a blunted configuration to facilitate the belt sliding thereover, said belt being centrally between one of said lower corners and an adjacent edge of said plate aperture;
    wherein said corners of blunted configuration and other portions of said connector cooperate to define means for generating a friction force on the safety belt such that (a) when said safety belt is retracted the connector is carried by said belt to said belt guide and (b) after said connector has contacted said belt guide the safety belt may continue moving through the connector under the action of the belt storage retractor.

2. The improvement of claim 1 wherein:
said upper two corners of said web generally facing away from said plate are each provided with a flat surface truncating such corners to provide said blunted configuration over the longitudinally extent of said web which is at least coextensive with said belt receiving aperture of said plate.

3. The improvement of claim 1 wherein:
said slide bar is of generally flat plate like configuration resting entirely upon one side of said connector fitting base plate and is held in assembled relation to said plate by the presence of the safety belt entrained thereabout.

4. The improvement of claim 3 wherein:
said slide bar has end flanges overlying said base late adjacent said belt receiving aperture which are of a greater lateral extent than said web.

5. A free running cinching connector for use with a safety belt of a vehicle passenger restraint safety harness, comprising:
    a connector fitting having a safety belt entraining aperture and a slide member on said fitting and entraining said safety belt to said fitting,
    said slide member having non-cinching belt engaging upper surfaces and cinching belt engaging lower surfaces whereby said fitting runs freely along said belt when said belt engages only said upper surfaces and said fitting is cinched in fixed relation to said belt when said belt is trapped between one of said lower surfaces of said slide member and said fitting by the pull of said belt about said slide member,
    wherein said safety belt harness includes a safety belt storage retractor and a web guide mounted to the vehicle such that portions of said safety belt associated with said connector hang generally vertically from said web guide in said vehicle when said belt is in a non-used position and wherein:
    said slide member is configured to cause said connector to be pulled up to said guide by friction forces between said belt, said slide member and said fitting when said connector is freely suspended thereon but so as not to prevent passage of said belt through said connector when so suspended to allow for full storage of said belt on said retractor.

* * * * *